United States Patent [19]

Bousky

[11] 3,781,464

[45] Dec. 25, 1973

[54] LIGHT SCANNING APPARATUS AND METHOD FOR CONVERTING DISPLAY INFORMATION INTO STORABLE VIDEO DATA

[75] Inventor: Samuel Bousky, Redwood City, Calif.

[73] Assignee: Ampex Corporation, Redwood City, Calif.

[22] Filed: Jan. 17, 1972

[21] Appl. No.: 218,200

[52] U.S. Cl. .............................. 178/5.4 ES, 178/7.7

[51] Int. Cl. .............................................. H01j 29/70

[58] Field of Search .......................... 178/5.4 ES, 7.7

[56] References Cited

UNITED STATES PATENTS

| | | | |
|---|---|---|---|
| 2,644,031 | 1/1953 | Klyce | 178/5.4 ES |
| 3,256,385 | 6/1966 | Miller | 178/5.4 ES |
| 2,832,818 | 4/1958 | Rosenthal | 178/5.4 ES |
| 3,349,174 | 10/1967 | Warschauer | 178/5.4 ES |
| 3,693,042 | 9/1972 | Fredkin et al. | 178/7.7 |

*Primary Examiner*—Paul J. Henon
*Assistant Examiner*—Mark Edward Nusbaum
*Attorney*—Robert G. Clay

[57] ABSTRACT

A display scanner system and method selectively scans a reflective display surface, and provides conversion of the display information to storable video signals. The system is responsive only to the diffuse reflection of the reflected light from the display surface, but not to the specular reflection therefrom. A motor driven, optical scan device converges one or more beams to respective focused spot or spots, while directing same through a selected arc to define a scan line, and also converts the input angular scan to a flat field scan. Selectively movable support means is provided to support and move the display surface in a direction normal to the scan line direction, and also to index to new positions along the line scan direction as required when scanning a wide display with a plurality of adjacent or overlapping rows of scan lines. In the color embodiment a group, or groups, of three light sensors are employed, with appropriate color separation filters to provide color video data signals. The multiple beam embodiment employs temporal and/or spacial separation of beams, to provide a reduction in deadtime between scans, and/or to obtain interlace information.

11 Claims, 10 Drawing Figures

LIGHT SCANNING APPARATUS AND METHOD FOR CONVERTING DISPLAY INFORMATION INTO STORABLE VIDEO DATA

BACKGROUND OF THE DISCLOSURE

1. Field

The invention relates to optical scanning systems, and particularly to reflective type scan systems and methods for deriving black and white, or color, video information from a display surface for storage on a selected external recording medium.

2. Prior Art

There are countless numbers of scanner systems presently in use for reading displays in many different forms such as maps, transparencies, documents, newspapers, photos, etc. Typical of such systems are vidicon scanners, and line scanners utilizing a scan spot.

Of these two typical systems, the vidicon scanner is a reflective type device which employs a vidicon tube to provide an image scan of the display area. Such a scanner has limited resolution in that the vidicon provides at best 1000 lines per raster, i.e., 1000 elements per scan line, whereas the invention obtains resolutions of the order of a magnitude greater, i.e., 20,000 elements per scan line.

The line scanners utilizing a scan spot are typically light transmissive systems which direct a form of scan beam through the display being scanned, or reflective systems which detect the specular light reflected from the display with detectors at either end or side of the scan line. These systems have problems associated with balanced light conditions and must provide means for integrating the light in some fashion, particularly when attempting to provide color separation as in a color video scanner system, wherein specular light may provide an incorrect color representation due to ink surface quality, glare, fluctuating ambient light, etc. In addition, the latter systems fail to provide means for simultaneously scanning with at least two beams, and for separating and detecting the simultaneously generated video signals indicative of the information in the beams. The invention system identifies each beam to provide means for extracting and detecting the information therein when employing simultaneous beam scans.

SUMMARY OF THE INVENTION

A display scanner directs a focused light beam, or a plurality of beams, in selectable pattern across a reflective display surface such as a map, photograph, newspaper, etc., to provide storable video signals. A concaved, simulated, integrating sphere, having slits therethrough, is disposed against the display surface and allows passage of the scanning ray bundle and the focused spot via the slits, to define the scan line on the display surface. The sphere traps the diffused light reflected from the display, but allows the specular reflection to pass therefrom. Light sensitive means capable of detecting either black and white, or color, is disposed in the integrating sphere, and is responsive to the diffuse reflection trapped within the integrating sphere, but not to the specular reflection, to provide black and white, or color video data signals. Movable support means selectively moves the display surface normal to the scan line direction, and/or in the line scan direction, to allow scanning of the display surface along a single row, or a plurality of adjacent or overlapping rows, of scan lines. Control apparatus is operatively coupled to both the movable support means and the optical scan means for the light beam, to precisely relate and maintain the respective motions and phase position therebetween. A single, or a plurality of beams, is employed depending upon the type of display scanner required and its particular application; e.g., whether interlace information is required for subsequent television display, whether deadtime between successive scans can be tolerated, etc.

A single input beam provides a single scanning spot, which scans each successive line in sequence, but includes deadtime between the scans. Multiple input beams are angularly separated in a plane parallel to the scan line direction, to provide temporal separation between successive scan spots to avoid deadtime between scans, and/or to provide spacial separation between two parallel scan lines simultaneously to obtain interlace information. In the latter case, means is provided to permit identification of the signals of the multiple beams. By way of example, a 4-input beam system provides avoidance or reduction of deadtime while still obtaining simultaneous data on two interlacing fields. In the latter system, both temporal and spacial separation of the scan beams is utilized.

Accordingly, it is an object of the invention to scan a reflective surface such as a (color) map with a light beam, for subsequent conversion of the light levels therefrom to storable video signals. The system is adapted to provide the video signals in black and white or preferably in three color structure, wherein the signals are derived in response to only the diffused reflection of light from the reflective surface, and not from the direct specular reflection which generally provides incorrect color due to ink surface quality, etc. The system contemplates compiling the signals in various formats suitable for television type display upon reconversion thereof in associated external record/playback apparatus. It follows that the system further provides a subsystem which functions as a reading or scanning portion of an overall system which permits selective readout display of the stored signal data. For example, the instant scanner system may introduce its video signals to a magnetic tape recorder, disc recorder etc., which acts as a buffer in a subsequent external ground based, or an airborne, panoramic television display system.

DESCRIPTION OF THE PREFERRED EMBODIMENTS

Figure 1:
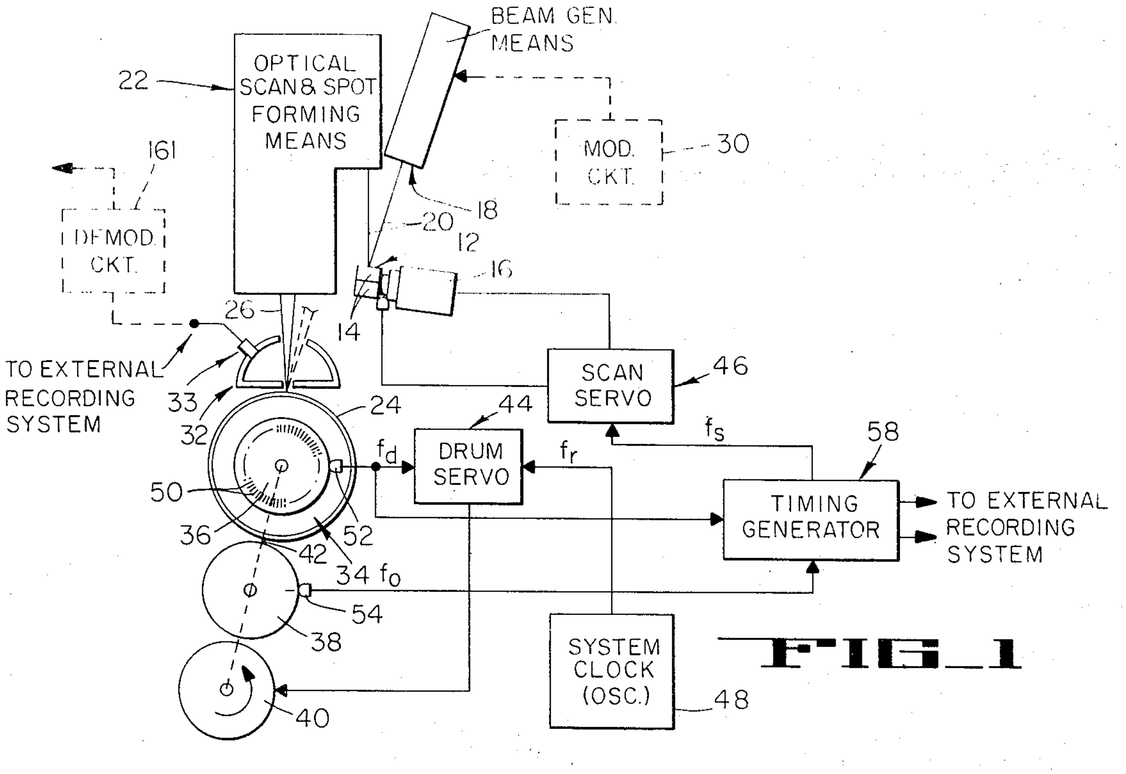
FIG. 1 is a block diagram illustrating the basic electro-optical combination of the invention.
Figures 2, 3:
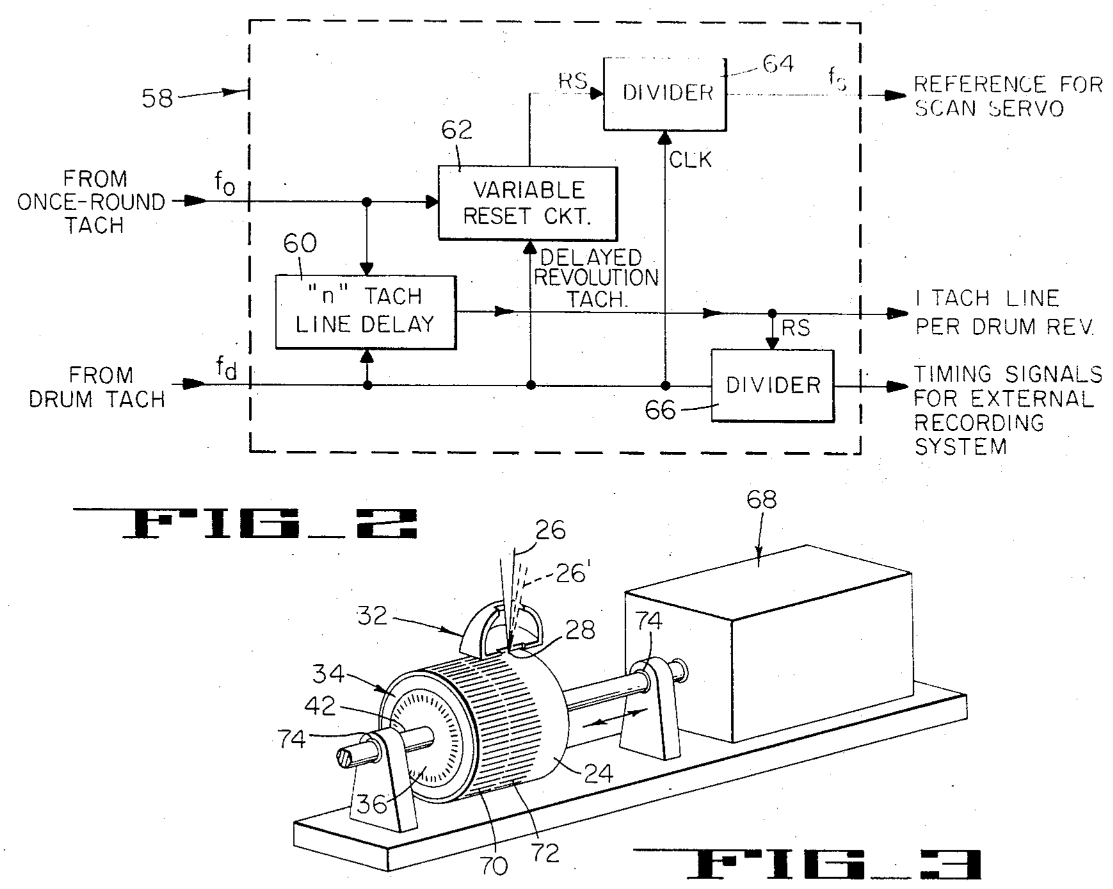
FIG. 2 is a block diagram depicting one embodiment of the timing pulse generator of FIG. 1.
FIG. 3 is a perspective of the drum means portion of the combination of FIG. 1, depicting apparatus for indexing the drum means in the direction of line scan to provide adjacent or overlapping rows of scan lines.

FIG. 1 illustrates an electrooptical combination in accordance with the invention. A rotatable polygon 12, comprising an integral plurality of mirrors 14, is driven by a scan motor 16 with a selected speed of rotation. Beam generating means 18 is disposed to generate and direct a single beam, or a selected plurality of beams, upon the rotatable polygon 12, which beam or beams are hereinafter all-inclusively termed, input beam 20. Thus it is understood that the beam generating means 18 may provide 1, 2, 4, etc. beams to define the (scanning) input beam 20, as further described with reference to FIGS. 5–9. Input beam 20 is reflected from the polygon 12 to optical scan and spot forming means 22. The rotatable polygon 12 imparts a scanning motion to the input beam 20 reflected therefrom, wherein the direction of the beam scanning motion will hereinafter be referred to as the "transverse" direction (meaning a direction transverse to the primary direction of motion of a display 24, further described below). The direction of primary movement of the display 24 being scanned, effects scan line separation and is hereinafter referred to as the "parallel" direction (the direction of rotation of the display 24). Thus when multiple rows of scan lines are made across its width, the display is incremented in selectable length steps in the transverse direction to define adjacent, or overlapping, rows of scan lines as depicted in FIG. 3.

The optical scan and spot forming means 22 forms each beam of the input beam 20 into a converging scan beam 26, to define a focused scanning spot upon the display 24, and also converts the input angular scan of the scan beam to a flat field scan, as further described below. In the invention embodiment employing a single input beam 20, a single scan beam 26 and associated scanning spot is generated by the optical scan and spot forming means 22. The spot scans each successive scan line 28 (FIG. 3) in sequence, but involves deadtime between the successive scan lines as the corners of adjacent mirrors 14 of the rotatable polygon 12 pass through the input beam 20.

In the embodiment employing two input beams 20, the beams are angularly separated in a plane extending in the transverse direction of previous mention, to provide temporal separation between the successive scanning spots, thus avoiding or reducing the deadtime between scans.

In addition, the invention contemplates two, etc., input beams 20, which are separated in the parallel direction of previous mention, to provide spacial separation of two simultaneously scanning spots thereby providing data on two parallel scan lines 28 simultaneously, but including deadtime between successive pairs of scans. The latter technique is employed in obtaining interlace information by generating the two interlacing fields of a typical television raster simultaneously. Modulating means (which includes the modulator circuit within the beam generating means 18), having preselected modulating frequencies is herein depicted in phantom line and identified by the numeral 30, and is included to permit identification of the two separate fields, as further explained below.

In still a further embodiment of the invention, provision is made for the generation of four input beams 20. In the latter embodiment, avoidance or reduction of dead time is effected, while also obtaining simultaneous information on two interlacing fields. Thus both temporal and spacial separation of the input beams 20 is utilized in the latter embodiment.

Integrating sphere means 32 is provided in the region of the scan line on the display 24, to provide a scanning operation wherein the direct specular reflection 26' of the scan beam (or beams) 26 on the reflective surface of the display 24 is removed and/or absorbed via slots in the sphere means 32, to allow only the diffused reflections from the display to be retained in sphere means 32, and thus detected. Removal of specular beams is via an upper slot but trapping and/or absorption of the removed beam is done externally and is not shown. The detection of the direct specular reflection could generally provide incorrect color balance, and accordingly is avoided by the invention combination to provide improved color video signals. Light sensing means 33 disposed in the sphere means 32, is equipped with spectrally selective filters for color separation, and provides means for detecting the integrated light corresponding to only the diffused light reflected from the display.

The display 24 may comprise, for example, a map, photograph, chart, newspaper, etc., and is wrapped about a rotatable drum means 34, which illustrates one form of movable support means capable of moving the display 24 in either one or two dimensions, depending upon the particular application and mode of scanning. The rotatable drum means 34 is mechanically coupled to a drum tach 36, a once-around tach 38 and a drum motor 40, via a common shaft 42.

Servo means are provided for precisely relating and maintaining the respective motions and phase positions of the rotating devices of the invention, viz., the drum means 34 and the rotatable polygon 12. To this end, by way of example only, there follows a description of one servo system which may be employed for example, with the 4-beam scanner of FIG. 9. Other known servo systems may be used instead. A drum servo 44 is operatively coupled to the drum means 34, while a scan servo 46 is operatively coupled to the rotatable polygon 12. The drum servo 44 is supplied a reference frequency from, for example, a crystal controlled oscillator, termed herein a system clock 48. A selected reference frequency $f_r$ from system clock 48 is compared with a frequency $f_d$ delivered via the drum tach 36 attached to the drum shaft 42 via the drum servo 44. The drum tach 36 is provided with a select number of tack lines 50, which are read via associated tack line transducer means 52. When the drum means 34 is rotating at such speed as to generate a frequency $f_d$ from the select number of tach lines 50 per revolution thereof, the drum servo 44 is locked-up and the drum motor 40 will continue to drive the drum means 34 at this speed. The drum shaft 42 also turns the one-around tack 38, which has a single tack line 54 thereon which is read via tack line transducer means 56. By way of example only, the once-around tack 38 is used to select one of the select number of tack lines 50 of drum tack 36 to define the drum revolution reference. The revolution reference may be located "$n$" tack lines before the first scan line 28 of the display 24. The first scan line of the display corresponds to the drum tack line number 1, so the revolution reference is located on the drum tack line equal to the total number of tack lines minus "$n$." The drum tack 36, the once-around tack 38 and the drum servo 44 thus are used to develop the appropriate timing signals for the scan servo 46 via a scan reference frequency $f_s$. A timing generator 58 is coupled to the once-around tack 38 and to the drum tack 36, and generates a plurality of new timing signals for use by the external recording system, as well as the reference frequency signal $f_s$ which is introduced to the scan servo 46.

The timing generator 58 is shown in greater detail in FIG. 2. Inputs from the once-around tack 38 ($f_o$) and the drum tack 36 ($f_d$) are introduced to the timing generator 58. The once-around tack ($f_o$) is delivered to a $n$ tack line delay 60 and a variable reset circuit 62. The drum tach ($f_d$) is delivered to the $n$ tach line delay 60, to the variable reset circuit 62, and to a pair of dividers 64, 66. Divider 64 is coupled to the variable reset circuit 62, and the divider 66 is coupled to the output from the $n$ tach line delay 60. The output of $n$ tach line delay constitutes one output from the timing generator 58, e.g. a one tach line/drum revolution signal. The divider 66 provides one or more divisions of the drum tach ($f_d$) to provide further timing signals in accordance with the external recording system requirements. The output from the divider 64 provides the reference frequency $f_s$ for the scan servo 46 of FIG. 1.

Although a specific embodiment of the servo system is shown in FIGS. 1 and 2, it is to be understood that the description is by way of example only; i.e., various servo circuits known in the art may be utilized, depending upon the requirements of the external recording system, whether the display support means is linearly translatable or rotatable, etc.

Referring now to FIG. 3, drum means 34 supports the display 24, and scan beam 26 scans a series of scan lines 28 of previous mention via the integrating sphere means 32. Drum indexing means 68 is coupled to the drum means 34 and provides apparatus for selectively incrementing the drum means 34, and thus the display 24, in selected length steps relative to the scan line length, in the transverse direction of previous mention. Thus, after a complete row 70, 72, etc., of scan lines 28 is made along the length of the display in the parallel direction, during one or more revolutions of the drum means wherein the drum means is stepped 34 a selected distance in the transverse (i.e., axial) direction after each row is recorded. The distance stepped may be equal to the scan line, or one-third, one-half, two thirds, etc., of the scan line length, depending upon the amount of row overlap required for subsequent display of the video information by the external panoramic display apparatus coupled to the scanner system.

The drum indexing means 68 may comprise a pneumatic, double acting, piston device (not shown) driven by air, fluid, etc., which axially steps the shaft 42, and thus the drum means 34, in either direction through the selected length steps of previous mention. The drum means 34 and means 68 may be mounted upon a suitable frame support such as for example, a lathe bed, etc., via bearings 74 which allow axial movement of shaft 42. Means is provided such as a detent mechanism to select an exact axial position of drum means 34 and thus of display 24, for accurately indexing the scan rows relative to each other. Other means for translating/indexing the drum means may comprise a reversible screw thread drive apparatus, etc. Obviously, the drum means may be alternately held stationary while the scan beam is translated in steps, axially along the display 24.

Figures 4, 5, 6:
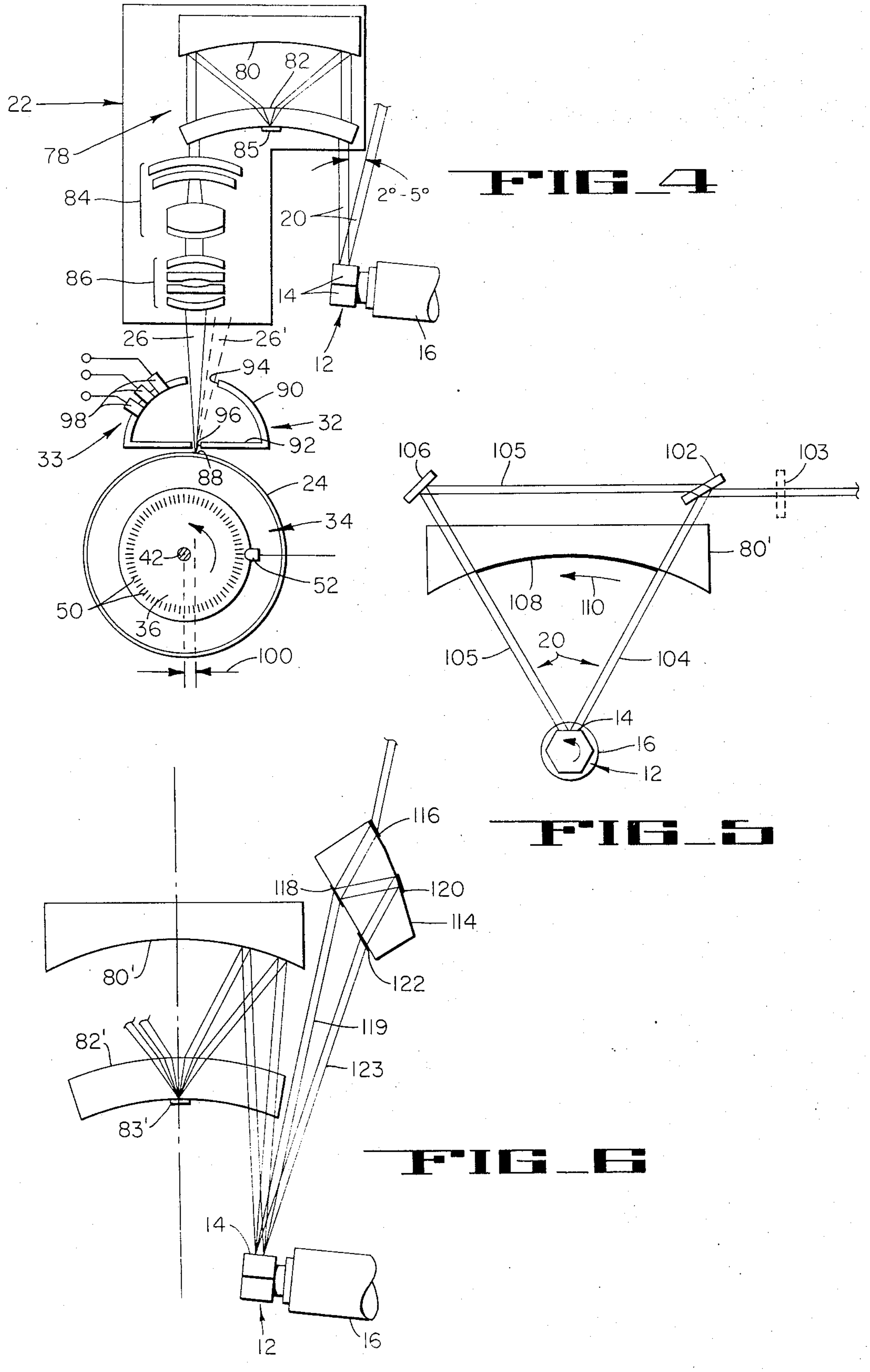
FIG. 4 is an optical schematic illustrating in greater detail one embodiment of the optical scan and spot forming means of FIG. 1.
FIGS. 5 and 6 are optical schematics illustrating in greater detail alternate optical arrangements of the beam generating means of FIG. 1.

The optical scan and spot forming means 22 of FIG. 1 is shown in greater detail in FIG. 4, utilizing a single input beam 20 by way of example. More examples and description of an optical scan and spot forming means as well as of beam generating means, may be found in U.S. Pat. No. 3,520,586 to S. Bousky, issued July 14, 1970, and assigned to the same assignee as this application. Accordingly, only a brief description of the optical scan and spot forming means 22 is included herein.

It should be noted that the invention combination is hereinafter described with reference to a color sensitive scanning system, i.e., a system capable of scanning a color display and of providing the storable video signals for the external recording system of the overall apparatus, in a three color structure. It is to be understood, however, that black and white video signals can be generated by the invention when scanning a black and white display.

To this end a multi-colored ("white light") input beam 20 is derived from a zenon arc lamp, a mixed gas ion laser, etc., within the beam generating means 18. The light source can be a PEK-75 lamp manufactured by PEK Laboratories, Sunnyvale, California which has a fairly uniform spectral distribution throughout the visible region, a Model 52 mixed gas Argon-Krypton laser manufactured by Coherent Radiation Laboratories, Palo Alto, California, which has three spectral lines of about equal intensity at 647, 514, and 488 nanometers, etc. The optical scan and spot forming means 22 generally comprises an optical catadioptric system 78 which includes concentric spherical reflector 80, and a spherical refractor 82 having a reflective strip 83. Further details of a catadioptric system are described in the above-mentioned U.S. Pat. No. 3,520,586. To allow access by the input beam 20 to the catadioptric system 78, without interference to the beam by the refractor 82, the axis of rotation of the polygon 12 is inclined slightly (e.g., 2° to 5°) to allow the incoming input beam 20 to pass by the edge of the refractor 82. The catadioptric system 78 provides optics for reimaging the pivoting point of the scanning beam in space, at a point generally opposite the reflecting point of the mirrors 14. An optical correcting device 84, such as an inverted Galilean telescope, introduces a reduction in the input scan angle, and permits design conversion of the usual arcuate scan path to a tangent function scan so that the focused spot will scan a flat field along the display 24. A spot forming lens 86 is included after the optical correcting device 84, to produce the converging scan beam 26 and thus the focused scan spot 88 on the surface of the display 24. The optical design may provide a scanning spot size as large as about 0.010 inch diameter, or as small as 0.00015 inch diameter, and a scan line length from less than an inch to over 9 inches.

The integrating sphere means 32 is disposed generally closely adjacent the display 24, and is simulated by means of a hemisphere 90, and a flat diametral member 92 integral therewith, to provide a concaved integrating hemisphere having a high degree of diffuse reflectivity on the inner surfaces thereof. The hemisphere 90 and diametral member 92 have suitably disposed slits 94, 96, formed therein for passage of the scan beam 26, and the focused spot 88, respectively. The slits extend along the transverse direction of previous mention, e.g., along the scan line (28) defined by the scan spot 88. Note that while slot 96 is very narrow, e.g., slightly larger than the scan spot size, the slit 94 is relatively wide e.g., slightly larger than twice the ray bundle size, to allow the specular reflection 26' to pass out of the hemisphere 90. However, a stabilized major proportion of the diffused reflection of the scan beam 26 from the display 24 is retained within the sphere means 32.

The light detector means 33 includes a group of photodetectors 98 (e.g. three, or multiples thereof) each equipped with spectrally selective filters for color separation and which are suitably disposed in one-half, or both halves, of the hemisphere 90, to receive the integrated light within the integrating sphere means 32. Duplication of the group, with one in each half of the hemisphere 90, may be made to enhance the video signal uniformity.

Note that the disposition of the shaft 42 of the drum means 34 is such that it is parallel to the plane of the scan spot 88, but is off-axis with respect to the plane of the scan beam 26, by a pre-selected amount indicated here by numeral 100. This provides two conditions; first, the avoidance of a bowed scan line 28 since the tangent to the drum surface and thus the display 24, at the scan plane, is made parallel with the axis of the rotatable polygon 12 and, second, the specular reflection 26' of the scan beam 26 reflected from the display 25 is sufficiently separated from the scan plane that its secondary reflections may be readily passed from the integrating sphere means 32 via the slit 94. That is, the specular reflection 26' is allowed to pass through the slit 94, whereupon it may be adequately trapped and absorbed by any of several well known means (not shown), to prevent its entering into the intergration within the integrating sphere means 32.

In operation, the focused light beam is successively scanned across the display 24 in the form of a row or rows (70, 72) of parallel scan lines 28 (FIG. 3). The diffused light, indicative of the display features, is detected by the light detector means 33, which provides a video signal output. The row may be scanned during one revolution of the drum means 34, or a selected number of scans may be skipped with each scan whereby a corresponding number of rotations of the drum means 34 is made to complete the entire row scanning process. The latter scanning mode provides interlace information, and is further described below, for example, relative to the FIG. 9 embodiment.

FIGS. 5–9 illustrate various alternative embodiments for the beam generating means 18 of FIG. 1. To this end, FIGS. 5 and 6 depict apparatus for generating two input beams 20, wherein the impingement of the beams upon the polygon 12 are angularly deployed either in a plane in the transverse direction as indicated in FIG. 5, or in a plane in the parallel direction as indicated in FIG. 6.

FIG. 5 provides an input beam from the light source (not shown), which is divided by a beam splitter 102 to provide a reflected beam 104 directed to a mirror surface 14 of the polygon 12, and a transmitted beam 105 which is reflected from a flat mirror 106 to impinge the same mirror 14 at an opposite angle relative to beam 104. The intensities of the beams 104, 105 are matched, and may be adjusted via a half-wave plate 103 (in phantom line) inserted before the splitter 102. Rotating the plate 103 adjusts the polarization of the input beam, to adjust accordingly, the relative intensities of light reflected/transmitted by the polarization sensitive splitter 102. The scanning beam reflected by the mirrors 14 (not shown) during rotation of the polygon 12 provides a scan arc 108 on the reflector 80'; the latter is similar to reflector 80 of the optical scan and spot forming means 22 of FIG. 4. If the rotation of the polygon 12 is counterclockwise on the page, the scan motion of the reflected scanning beams (104, 105) travels from the right to the left of the scan arc 108, as shown by the arrow 110. The two beam generating means of FIG. 5 can reduce or eliminate the deadtime between successive line scans. For the hexagonal polygon 12 shown, the beams 104, 105 impinge upon the mirror 14 at an angle of 60° from each other. Thus as beam 105 scans through 60°, and the corner of the polygon 12 begins to occlude it, the second beam 104 is active in its scan. This arrangement provides temporal separation between the two scanning beams with continuity of scan, or may even provide for some data overlap (redundancy) at the ends of the scan lines. Note that "temporal" separation is herein intended to mean separation in the transverse direction.

In FIG. 6, the input beam is directed from the light source (not shown) to a beam splitter 112 comprising an optical flat which has all, or a portion 114, of its first surface angularly inclined to provide a slight exit beam angle. The magnitude of the angle is a small fraction of a degree and is determined by the focal length of lens 86 (FIG. 4) and the spacing of lines 28 (FIG. 3). The input beam enters the splitter 112 via an anti-reflective coating 116 on the entrance portion of the first surface, which coating passes essentially all the incident light. The beam is passed to a partially reflective coating 118 on the second surface of the optical flat 112, whereby a select amount of the incident light is reflected, while the remainder passes as an input beam 119 to the mirror 14 of polygon 12. The reflected portion of the beam is directed to a totally reflective coating 120 which is disposed on the beveled portion of the first surface, whereby the reflected beam is transmitted from the optical flat via an anti-reflective coating 122 on the second surface thereof, and is directed as an input beam 123 to the same mirror 14 of the polygon 12. As may be seen the use of the angularly inclined portion 114 of optical flat 112 provides two input beams 119, 123 (corresponding to input beam 20 of previous description), which coverge at a very small angle therebetween to a common point on mirror 14. The beams are reflected from the mirror 14, through the refractor 82', and thence to the reflector 80' which, in turn, focuses the beam upon the reflective element 83', etc. Since the beams 119, 123 impinging upon the polygon means 12 have a small angular separation between them, the final spot forming lens 86 (FIG. 4) will focus two spots spacially displaced i.e., displaced in the parallel direction, such that two parallel scan lines 28 are scanned during each scan period. However, the optical configuration of the two beam generating means of FIG. 6 does not eliminate the deadtime between successive scans, but permits simultaneous scanning with two spots. The small angle between the impinging scan beams may be selected such that the two focused spots are separated by just one line width.

Figure 7:
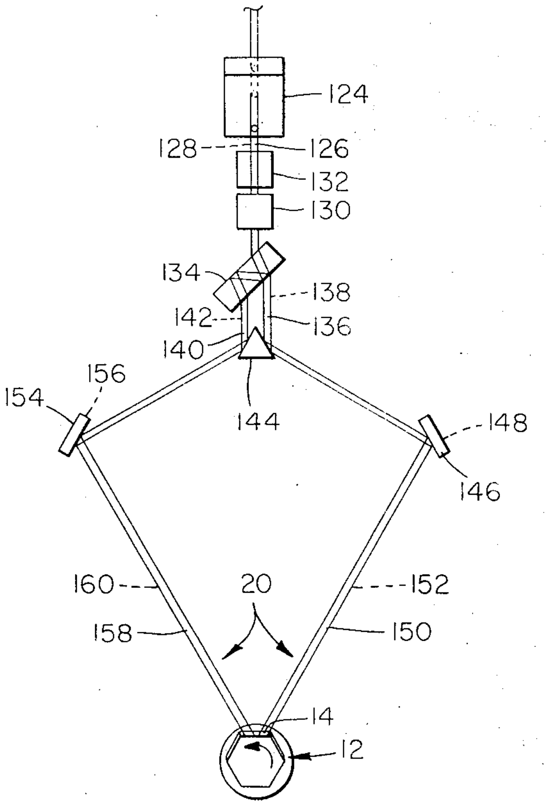
FIGS. 7 and 8 are plan and side views respectively of a further embodiment of the beam generating means of FIG. 1, providing a four beam configuration.
Figure 8:
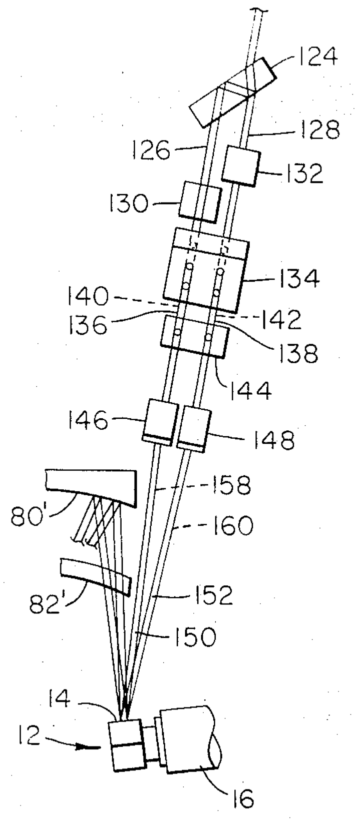

The embodiment of FIGS. 7 and 8, utilizes both the principles of temporal, i.e., transverse, separation of beams, shown in FIGS. 5, and spacial, i.e., parallel separation of beams, shown in FIG. 6, and employs a total of four imput beams to define beam 20 of previous description. Thus a single input beam from the light source (not shown) is directed to a first beam splitter 124, which is similar to the beam splitter 112 of FIG. 6, but without the beveled portion 114. Thus the output beams from beam splitter 124 are parallel rather than coverging as in FIG. 6. Beams 126, 128 may be directed through respective modulators 130, 132 and thence to a second beam splitter 134 which provides four parallel beams 136, 138, 140, 142. (Note that a beam which is "hidden" behind another beam, is herein identified in the FIGS. 6, 7 by a dashed lead line.) Beams 136, 138 are reflected from the same side of a roof mirror 144, and thence to a respective pair of flat mirrors 146, 148 which direct the resulting input beams 150, 152 to the mirror surface 14 of the polygon means 12 at the indicated angle of 60° therewith. The other pair of beams 140, 142 are reflected from the opposite surface of the roof mirror 144, and thence to a pair of flat mirrors 154, 156, whereupon the resulting input beams 158, 160 are reflected to the same mirror 14 at an angle of 60° with the input beams 150, 152. Although a pair of modulators are shown, only one of the modulators 130 or 132 may be employed, as further described below in FIG. 10, depending upon the type of modulating scheme used.

Since the two pairs of spacially separated beams 150, 152 and 158, 160 scan simultaneously, the output information from each pair is available within the integrating sphere means (32 of FIGS. 1 and 4) at the same time, thus necessitating some means for identifying the data generated via the respective pairs of spots, individually. Accordingly, one means for providing identification of the separate signals is by synchronous time sharing by means of modulators 130, 132 disposed in the two parallel beams 126, 128 following the first beam splitter 124. The modulators 130, 132 are operated at a frequency substantially above the bandwidth of the video information generated via the display which is being scanned. For instance, if the video information from the display 24 (FIGS. 1 and 4) subtends a bandwidth of 3MHz, the modulators are operated at 7MHz and are alternately switched. In this way, the output data from each of the two pairs of simultaneous beams will, in effect, be an amplitude modulation superimposed upon the modulation frequency provided by the modulators 130, 132. The alternate switching of the modulators allows the signals to be detected and retrieved via synchronous, time sharing, demodulation techniques, via a demodulator circuit (indicated in FIG. 1 in phantom line and by numeral 161). The demodulator is coupled to the output of photodetectors 98, or by a similar demodulator circuit provided in the external recording system prior to recording of the video information. A preferred modulation/demodulation scheme is described via FIG. 10 below, and utilizes only one of the two modulators (130, 132).

For certain special applications as when providing a scan overlap between rows of scan lines, it may be desirable to separate the interlacing fields on a temporal basis, rather than on a spacial basis as described in the embodiments of FIGS. 7, 8. This is accomplished by an alternate embodiment of the invention beam generating means, depicted in FIG. 9. In this embodiment, the four input beams to the polygon 12 lie in a common incident plane, and any spacial separation is provided by parallel movement of the display. An input beam from the light source (not shown) is introduced to a first beam splitter 162, similar to splitter 124 of FIGS. 7, 8. A retardation plate 163, shown in phantom line, and comprising a half-wave plate, may be inserted before the splitter 162, to permit adjusting the polarization of the input beam, and thus adjust the intensities of the beams emerging from the splitter 162. Two parallel beams 164, 166 are generated, and are oppositely reflected via a roof mirror 168 into respective modulators 170, 172. The beams 164, 166 are then respectively passed through half-wave plates 174, 176 and into second beam splitters 178, 180. The transmitted portions of the respective beams 164, 166 are reflected from flat mirrors 182, 184 respectively, and thence at an angle of 60° therebetween to impinge the mirror 14 of the polygon 12 as input beams 186, 188. The reflected portion 190, 192 of the input beams 164, 166, from the beam splitters 178, 180, are directed to opposite sides of the mirror 14, into reflecting prisms or flat mirrors 194, 196 respectively, and thence against the mirror 14 at angles of 30° with the beams 188, 186 respectively.

The scanning spots which are formed via the input beams 186–192 are displaced within the same scanning plane by one-half a scan line length. However, the line length is now twice that needed for presentation, upon retrieval in the external recording device of the panoramic television display system of mention in FIG. 1. Thus, the interlacing fields are displaced in time and the image reconstruction for presentation on the television display device of the external system may select any series of half-line lengths, while yet retaining proper interlace information.

Figures 9, 10:
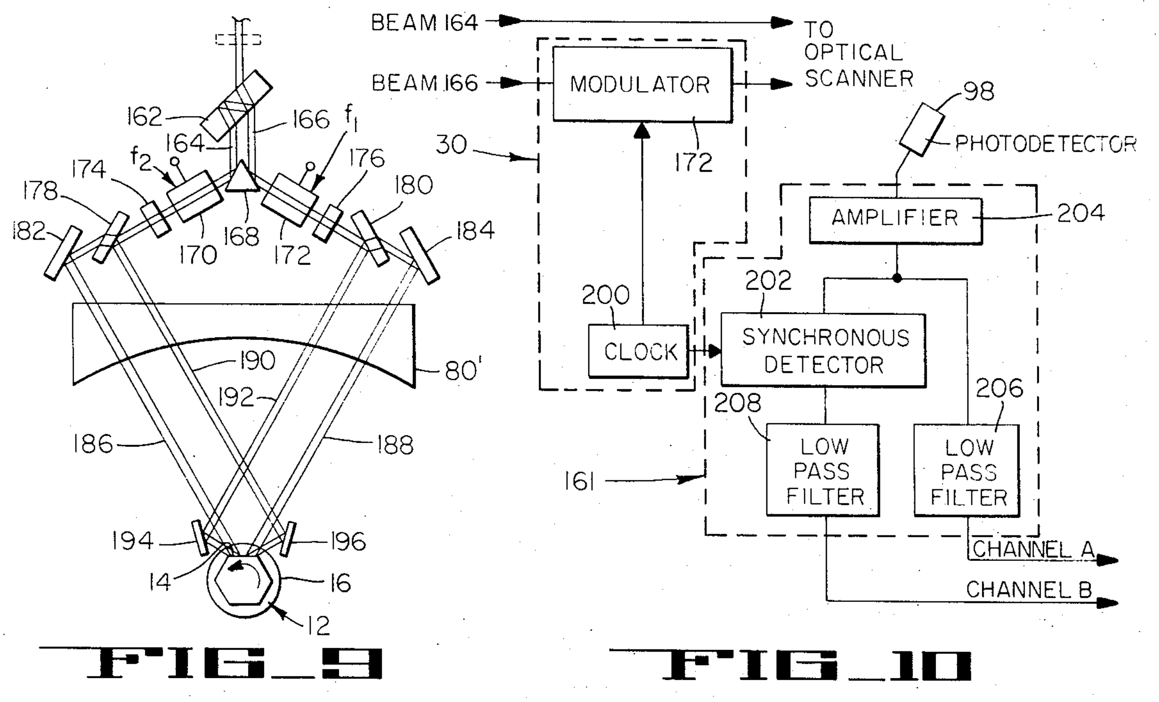
FIG. 9 is a plan of a further embodiment of the beam generator means of FIG. 1, providing an alternate four beam configuration.
FIG. 10 is a block diagram of a modulator circuit which may be employed to identify simultaneous beams of a multiple beam system, as depicted in FIG. 1.

FIG. 10 depicts by way of example only, one form of modulator 30 and demodulator circuit 161 (See FIG. 1) for identifying the signals delivered by the photodetectors 98. In the modulation process shown here, only one modulator (172) of FIG. 9 is employed to provide modulating one beam, to allow subsequent synchronous detection of the output signals via demodulator circuit 161. The modulator 172 is driven via a clock 200 at a selected frequency above the bandwidth of the video information from the display 24; e.g., for a video bandwidth at 3 MHz, the clock 200 may supply a modulating frequency of 7 MHz squarewave. Thus the beam(s) 192, 188 are modulated at the clock frequency. However, both modulators 170, 172 are employed in a time share type of modulator/demodulator circuit, which may be used instead of the synchronous detection circuit shown here.

The demodulator circuit 161 shown herein is a synchronous detection type circuit. The clock 200 drives a synchronous detector 202 of the demodulator circuit 161 with the same frequency used to modulate the beams 192, 188. The output from one photodetector 98 is amplified in amplifier 204 and is introduced to the synchronous modulator, i.e., detector 202, as well as to a first low pass filter 206. The output from the detector 202 is introduced to a second low pass filter 208. The filters 206, 208 have a cutoff frequency of, for example, 3 MHz and define video channels A and B which represent the information contained in any two beams which are simultaneously scanning the display. Thus, demodulator circuit 161 provides video signals on channels A and B with, for example, a one-half scan line delay between the information in channel B (corresponding to the input beam 186 or 190 of FIG. 9) relative to the information in Channel A (corresponding to the input beam 192 or 188, respectively). Only one photodetector 98 and associated pair of channels A and B of the demodulator circuit is depicted here, with generate one video color signal of a three color structure, e.g., of the red, blue, green color video signals. The two other photodetectors 98 are coupled to identical circuits, but are not shown here to simplify the description.

Although a hexagonal polygon 12 is shown herein as the rotatable means for providing the beam scanning action, polygons of other numbers of surfaces e.g., 4, may be employed instead. The number of polygon surfaces determines the scan angle (e.g., 6 sided provides a 60° scan angle, 4 sided a 90° scan angle, etc.). The length of the scan line depends upon the focal length of the spot forming lens 86, once the scan angle is determined. Thus $F\theta=L$ for a curved scan line, where F is the focal length, $\theta$ is the scan angle, and L is the scan length. For a flat field of scan, it follows that $2F \tan \theta/2 = L$.

I claim:

1. A light beam scanner for generating a video signal representative of a selected display and including a light source and rotatable mirror polygon, comprising the combination of;

optical means including said rotatable polygon for forming and directing at least one scan spot from a corresponding light scan beam through a selected scan angle relative to the display to define a series of predetermined scan lines across the display via transverse movement of the scan spot in response to rotation of the polygon;

means including light sensing means operatively coupled to the optical means for providing the video signal in response to the diffuse light of the scan beam reflected from the display; and means for translatably supporting the display relative to the scan spot, and for moving the display in a direction transverse to the spot scan direction, to define at least one row of scan lines extending across the display.

2. The scanner of claim 1 wherein said means for translatably supporting includes, means for selectively incrementing the display parallel to the direction of the spot scan to define a plurality of rows extending across the display.

3. The scanner of claim 2 wherein the optical means includes means for generating a plurality of scan beams within a common plane and having a temporal separation therebetween of selected delay proportional to the number of scan beams, said rows being overlapped an amount proportional to the number of scan beams.

4. The scanner of claim 1 wherein the display is flat along the scan line direction, and the optical means includes corrector optics for directing the scan spot along the flat display to define a flat field of scan.

5. The scanner of claim 1 wherein the means for providing includes, a selected enclosed portion of a sphere having slots formed therein and disposed adjacent the display, the slots conforming to the spot scan line; wherein the light sensing means is integral with the sphere to detect the diffused light reflected from the display to define said video signal indicative thereof.

6. The scanner of claim 5 wherein the light sensing means includes a plurality of photodetectors having selected filters to provide a corresponding plurality of color signals indicative of the diffused light reflected from the display.

7. The scanner of claim 5 wherein the optical means includes, beam generating means for generating a pair of scan beams having a temporal separation therebetween, and optical scan and spot forming means for forming the scan beams into respective light scan spots which are scanned across the display.

8. The scanner of claim 7 wherein the beam generating means includes first beam splitter means and mirror means for forming a first pair of light input beams from the light source and for directing the first pair of input beams against the rotatable mirror polygon with a selected angle therebetween commensurate with the number of polygon surfaces to define a temporal separation between the first pair of beams.

9. The scanner of claim 8 wherein the beam generating means further includes;

second beam splitter means and mirror means disposed to receive the first pair of light input beams from the first beam splitter means, and to form a second pair of input beams having a selected slight angle with the first pair of beams to define a spacial separation between the first and second pair of beams; and modulator means disposed in at least one of the first pair of input beams to selectively modulate same to allow identification of simultaneously occurring video signals via said sphere and light sensing means.

10. The scanner of claim 8 wherein the beam generating means further includes;

second beam splitter means and mirror means disposed to receive the first pair of light input beams from the first beam splitter means, and to form a second pair of input beams within the same plane of the first pair of beams to define a selected temporal separation between each of the second pair of beams and the first pair of beams; and modulator means disposed in at least one of the first pair of beams to selectively modulate same to allow identification of simultaneously occurring video signals via said sphere and light sensing means.

11. The scanner of claim 5 wherein the optical means includes beam generating means for generating a pair of scan beams having a spacial separation therebetween, and optical scan and spot forming means for forming the scan beams into respective light scan spots which are scanned across the display.

* * * * *

UNITED STATES PATENT OFFICE
CERTIFICATE OF CORRECTION

Patent No. 3,781,464 Dated December 25, 1973

Inventor(s) Samuel Bousky

It is certified that error appears in the above-identified patent and that said Letters Patent are hereby corrected as shown below:

Page 1, column 1, line 4, between the title and "Background of the Disclosure", insert the following paragraph:

-- The invention herein described was made in the course of a contract with the Department of the Navy. --

Signed and sealed this 17th day of December 1974.

(SEAL)
Attest:

McCOY M. GIBSON JR.
Attesting Officer

C. MARSHALL DANN
Commissioner of Patents

ORM PO-1050 (10-69)
USCOMM-DC 60376-P69
☆ U.S. GOVERNMENT PRINTING OFFICE : 1969 O—366-334.